United States Patent
Kyrtsos

(10) Patent No.: US 6,477,451 B1
(45) Date of Patent: Nov. 5, 2002

(54) METHOD FOR MONITORING THE PERFORMANCE OF A DRIVE LINE OF A VEHICLE

(75) Inventor: Christos T. Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/431,443

(22) Filed: Nov. 1, 1999

(51) Int. Cl.$^7$ .............................................. B60K 17/34
(52) U.S. Cl. .......................................... 701/29; 701/31
(58) Field of Search .............................. 701/29, 69, 31, 701/32, 33; 180/233, 248; 73/457, 465, 466, 593, 660, 962

(56) References Cited

U.S. PATENT DOCUMENTS

| | | |
|---|---|---|
| 5,419,192 A | 5/1995 | Maxwell et al. |
| 5,641,904 A | 6/1997 | Kopp et al. |
| 5,893,892 A | 4/1999 | Loeffler |

FOREIGN PATENT DOCUMENTS

| | | |
|---|---|---|
| EP | 0710841 A2 | 11/1995 |
| EP | 0913694 A1 | 10/1998 |

*Primary Examiner*—Richard M. Camby
(74) *Attorney, Agent, or Firm*—Carlson Gaskey & Olds

(57) ABSTRACT

A method for monitoring the performance of a drive line of a vehicle during driving of the vehicle is disclosed. A sensor is mounted in a non-contacting relationship on a component of the vehicle for detecting acoustic energy present in the drive line of the vehicle. The acoustic energy is compared to either a predetermined operating limit or developed performance tolerances both of which represent limitations to ideal performance of the drive line. In a further embodiment, the method includes detecting a measurable quantity at the drive line, generating successive signals representative of this quantity, and developing a tolerance from the successive signals. A comparison of a subsequent signal to a previous signal is conducted to determine if the subsequent signal is outside the tolerance. Finally, a further embodiment detects frequencies of rotation at the ends of the drive line during operation of the drive line. This embodiment compares the frequencies of rotation to establish a differential that is indicative of the performance of the drive line.

18 Claims, 4 Drawing Sheets

METHOD FOR MONITORING THE PERFORMANCE OF A DRIVE LINE OF A VEHICLE

BACKGROUND OF THE INVENTION

The subject invention generally relates to a method for monitoring performance of a drive line of a vehicle during driving of the vehicle.

In a typical vehicle, including a heavy vehicle such as a truck or tractor-trailer, a drive line functions between a transmission of the vehicle and a drive axle of the vehicle. More specifically, the drive line transmits rotational forces from the transmission, through a differential mechanism, and ultimately to the drive axle of the vehicle whereupon driven wheels of the vehicle are rotated to move the vehicle. The typical vehicle often includes more than one drive line to optimally move the vehicle. This is particularly the case with a heavy vehicle that includes both forward and rear drive axles. As appreciated, the drive line or lines are coupled to necessary components of the vehicle with universal joints.

Continuing, it is recognized that drive lines wear, and it would be beneficial to develop a way of monitoring wear on a drive line. Conventional methods to monitor the performance of the drive line include monitoring vibration and comparing the vibration levels to preset limits. Further conventional methods to monitor the performance of the drive line actually require the drive line to be inspected in a repair garage by a mechanic. In such cases, the mechanic shakes the dive line to determine how loose the drive line is in the vehicle. These conventional methods are somewhat imprecise methods of determining wear.

SUMMARY OF THE INVENTION AND ADVANTAGES

A method for monitoring the performance of a drive line of a vehicle during driving of the vehicle is disclosed. Specifically, the method comprises the following steps. A sensor is mounted on a component of the vehicle for detecting acoustic energy present in the drive line of the vehicle. More specifically, the sensor is mounted on the component of the vehicle in a non-contacting relationship with the drive line for monitoring the performance of the drive line during driving of the vehicle. Utilizing a non-contacting sensor to detect the acoustic energy present in the drive line of the vehicle is preferred because the extent of interference that is detected by the sensor is minimized as there is no direct mechanical contact between the sensor and the drive line.

It is a further object of the subject invention to provide another method for monitoring the performance of the drive line of the vehicle during driving of the vehicle. In particular, this alternative method comprises the following steps. First, vibration in the drive line of the vehicle is detected. Successive signals are correspondingly generated from the detected vibration. Next, a tolerance is developed from the successive signals, and at least one subsequent signal from the sensor is compared to at least one previous signal from the sensor to determine if the subsequent signal is outside the developed tolerance.

It is a further object of the subject invention to provide another method for monitoring the performance of the drive line of the vehicle during driving of the vehicle.

In particular, this alternative method comprises the following steps. A first frequency of rotation is detected at a first end of the drive line. Similarly, a second frequency of rotation is detected at a second end of the drive line. Next, the first frequency of rotation is compared to the second frequency of rotation. Finally, a differential between the first frequency of rotation and the second frequency of rotation is determined, and the performance of the drive line of the vehicle is monitored during driving of the vehicle by evaluating the differential.

Accordingly, the subject invention discloses, in sum, a method for monitoring the performance of the drive line of the vehicle. In specifically confronting the deficiencies of the prior art, the subject invention discloses a method that utilizes a non-contacting sensor to detect energy present in the drive line of the vehicle and generates signals representative of the energy. In various embodiments, the method compares the signals to previously generated signals, to a predetermined operating limit, and to developed tolerances during driving of the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1A:
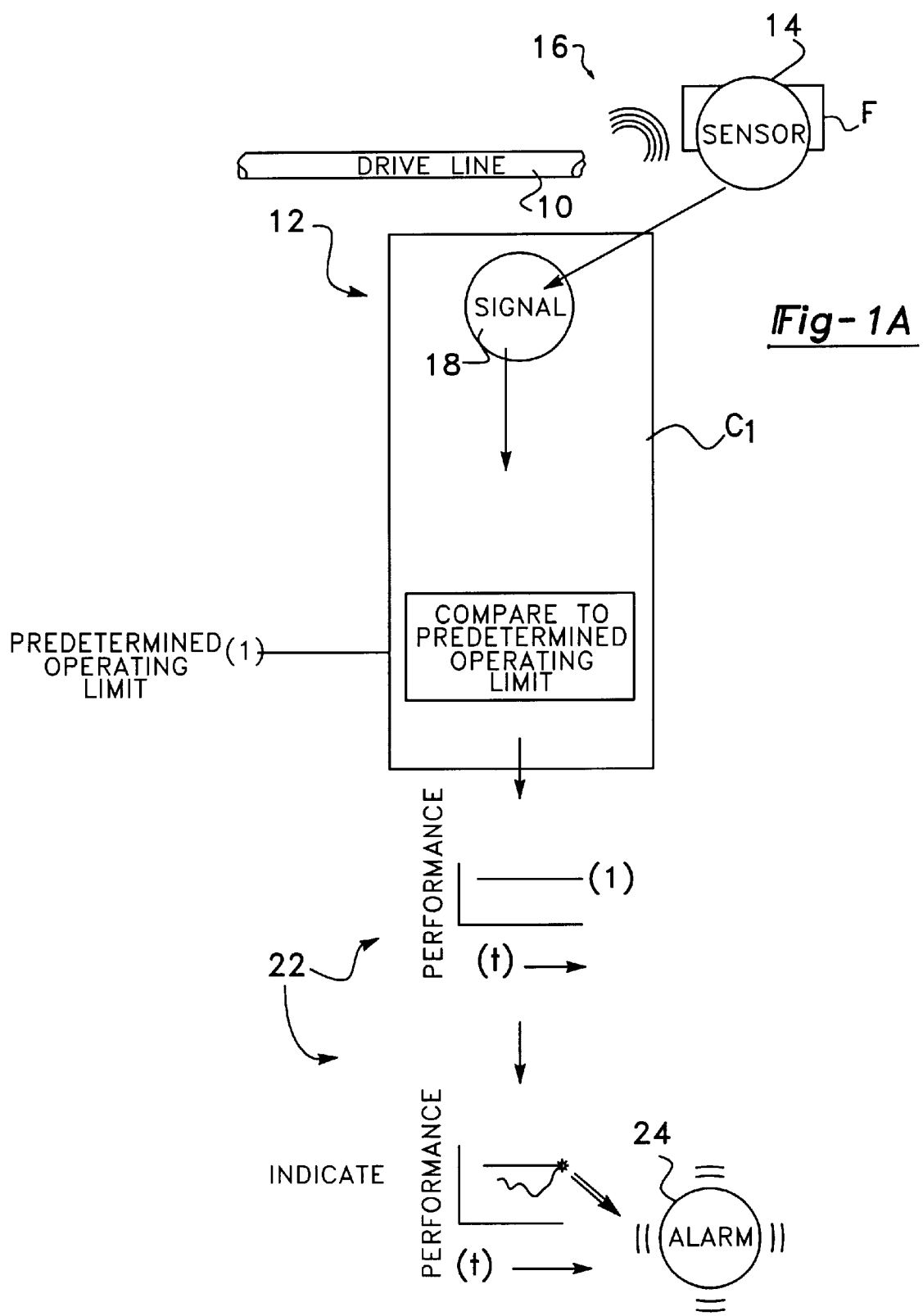
FIG. 1A is a schematic block diagram illustrating a method for monitoring the performance of a drive line of a vehicle utilizing a sensor mounted in a non-contacting relationship with the drive line and comparing a signal to a predetermined .operating limit.

Referring to the Figures, wherein like numerals indicate like or corresponding parts throughout the several views, a method for monitoring the performance of a drive line 10 of a vehicle is generally shown at 12. Referring specifically to FIG. 1A, a sensor 14 is mounted on a component of the vehicle, such as the frame, F, at a location adjacent the drive line 10. As shown in FIG. 1A, the sensor 14 detects acoustic energy 16 present in the drive line 10 of the vehicle to monitor the performance of the drive line 10 for increases in acoustic energy 16 that are representative of a defect in the drive line 10 of the vehicle. Preferably, the sensor 14 detects acoustic energy 16 that indicates increased friction or increased rubbing at or near a universal joint, not shown in the. Figures, critical to the drive line 10. It is also preferable to utilize the sensor 14 to detect acoustic energy characteristics, such as frequency, that are unique to the increased friction and the increased rubbing associated with defects in the drive line. As appreciated, since the drive line 10 of the vehicle rotates at extreme speeds, it is desirable to implement a filter to filter out any acoustic energy that is merely generated from the rotation of the drive line 10.

The method further comprises the step of mounting the sensor 14 on the component of the vehicle in a non-contacting relationship with the drive line 10. Since the sensor 14 is mounted on the component of the vehicle, an operator of the vehicle can monitor performance of the drive line 10 during driving of the vehicle. Also, as a result of the non-contacting relationship between the sensor 14 and the drive line 10, the extent of interference that is detected by the sensor 14 is minimized as there is no direct mechanical contact between the sensor 14 and the drive line 10. As shown in FIG. 1A, the sensor 14 is mounted on frame F at a support structure of the drive line 10. More specifically, the sensor 14 is preferably mounted in an air brake chamber of the vehicle close to the drive line 10 because the air brake chamber amplifies the acoustic energy 16 produced during rotation of the drive line 10. When the sensor 14 is mounted on frame F or in the air brake chamber of the vehicle, the sensor 14 is located within the vehicle at a position nearest the drive line 10 and the amount of hardware that is required can be minimized. The sensor 14 is also mounted on a non-rotating component of the vehicle. This permits optimum operation of the acoustic energy sensor 14 by shielding the sensor 14 from any acoustic energy generated from the rotation of such a component.

At least one signal 18 is generated from the sensor 14 representing the acoustic energy 16 present in the drive line 10. In a further embodiment of the subject invention the sensor 14 generates successive signals 20 that continuously represent the acoustic energy 16 present in the drive line 10. This further embodiment will be discussed in more detail below.

The method of the subject invention further includes the step of comparing the signal 18 from the sensor 14 to a predetermined operating limit of the acoustic energy 16 representing an acceptable limit of performance of the drive line 10. A controller, $C_1$, is implemented to compare the signal 18 from the sensor 14 to the predetermined operating limit. As shown in FIG. 1A, the predetermined operating limit is more specifically defined as an upper predetermined operating limit (1). The upper predetermined operating limit (1) is established from known performance limitations of the drive line 10 of the vehicle. As a result, different drive lines 10 may have different performance limitations in different vehicles, and in such a case, the upper predetermined operating limit (1) may be modified to conform to the performance limitation of a particular drive line 10 or vehicle. In addition to comparing the signal 18 from the sensor 14 to the upper predetermined operating limit (1), the controller $C_1$, can also be utilized to establish the upper predetermined operating limit (1) on an ongoing basis from rotation of the drive line 10 over the life of the vehicle. In such a case, the controller $C_1$, utilizes understood analytical methods such as fuzzy logic and neural networking to define the upper predetermined operating limit (1).

Next, a scale 22 of the performance of the drive line 10 is provided. The scale 22 includes standard X and Y axes. Specifically, the X axis is representative of time (t) and the Y axis is representative of performance. The scale 22 plots the performance of the drive line 10 over time. As shown in FIG. 1A, the Y axis of the scale 22 encompasses the upper predetermined operating limit (1) of a particular drive line 10 and even spans beyond the upper predetermined operating limit (1). Now, a level of the performance of the drive line 10 is indicated to the operator of the vehicle. Preferably, the indication of the level of the performance includes a representation of the scale 22 to the operator. In such a case, the operator of the vehicle can evaluate the performance of the drive line 10 on the scale 22 relative to the upper predetermined operating limit (1) even if the performance of the drive line 10 actually exceeds the upper predetermined operating limit (1). As appreciated, as friction or rubbing increases, the acoustic energy 16 detected by the sensor 14 also increases and approaches the upper predetermined operating limit (1). The method of the subject invention further includes the step of activating an alarm indicator 24 of the vehicle when the signal 18 is at the upper predetermined operating limit (1) of the acoustic energy 16. In practice, when the alarm indicator 24 is activated, the operator can refer to the indication of the level of the performance of the drive line 10 on the scale 22 and evaluate the performance of the drive line 10 relative to the upper predetermined operating limit (1).

Figure 1B:
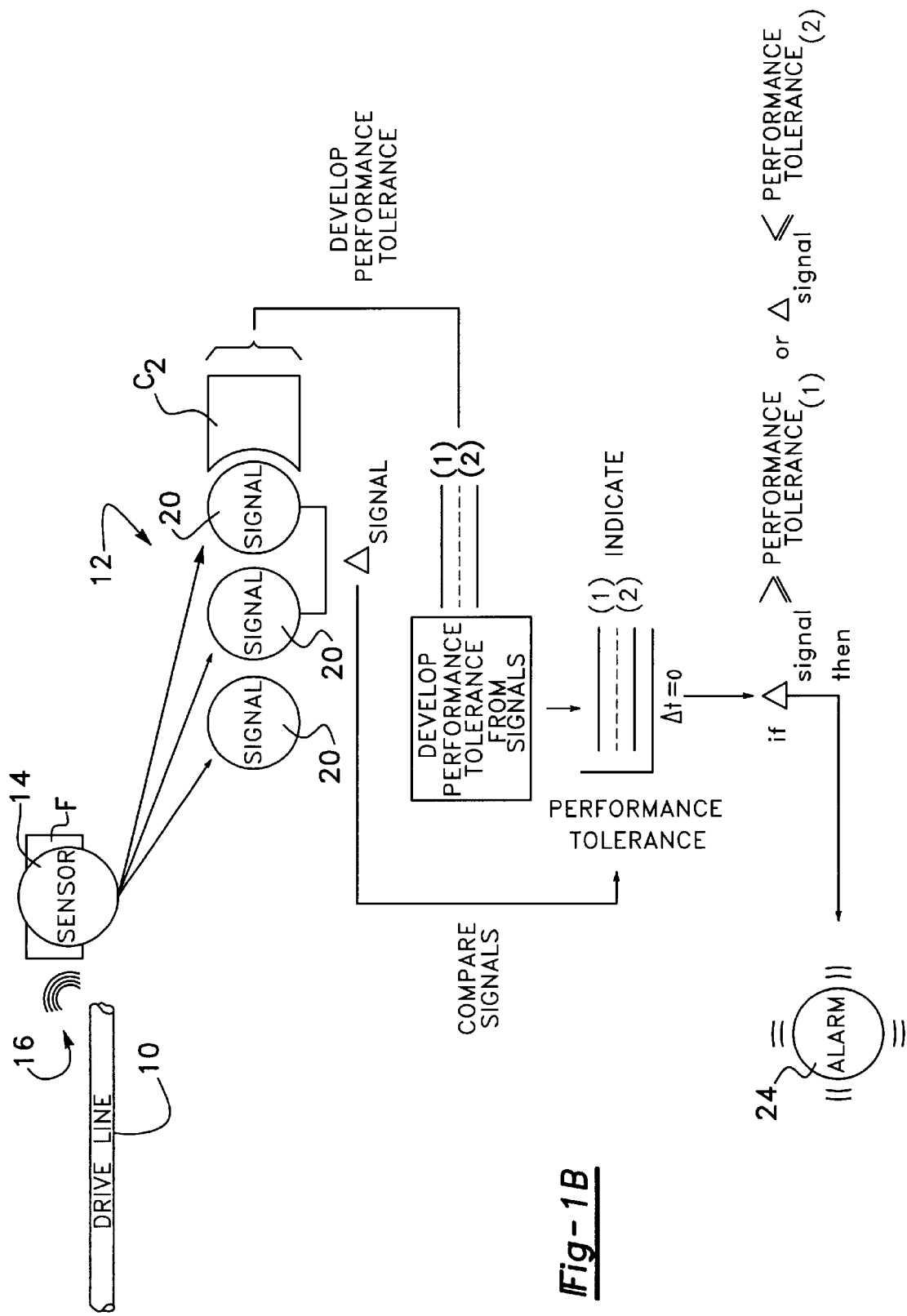
FIG. 1B is a schematic block diagram illustrating a method for monitoring the performance of the drive line of the vehicle utilizing the sensor from FIG. 1A that generates successive signals and compares a subsequent signal to a previous signal to determine if the subsequent-signal is outside a developed performance tolerance.

A further embodiment of the subject invention is also shown in FIG. 1B. This further embodiment also involves the non-contacting sensor 14 where the non-contacting sensor 14 generates successive signals 20 that represent the acoustic energy 16 present in the drive line 10. Preferably, the successive signals 20 are realized as wave signals having sinusoidal characteristics over time. As such, the successive signals 20 possess characteristic cycles, periods, and amplitudes over time, all of which are measurable if desired.

A performance tolerance of the acoustic energy 16 is developed by evaluating the characteristic cycles, periods, and amplitudes from the successive signals 20 that are generated from the sensor 14. As shown in FIG. 1B, the performance tolerance of the acoustic energy 16 is more specifically defined by an upper performance tolerance (1) and a lower performance tolerance (2). More specifically, a controller, $C_2$, is implemented to evaluate the successively generated signals 20 and formulate the performance tolerance. For example, for a particular drive line 10, the performance tolerance may be formulated to +/-5% by the controller. Next, at least one subsequent signal from the sensor 14 is compared to at least one previous signal from the sensor 14 and it is determined if the subsequent signal is outside the developed performance tolerance of the acoustic energy 16. As appreciated, the embodiment disclosed in FIG. 1B may compare more than one subsequent signal to more than one previous signal. Further, the subject embodiment may compare a subsequent signal to a previous signal that is not immediately preceding the subsequent signal. As appreciated, the controller $C_2$ can also be utilized to conduct the comparison of the subsequent signals to the previous signals. Alternatively, an additional controller, not shown in the FIG. 1B, can be implemented to conduct this comparison.

As with the initial embodiment disclosed above, a level of the performance of the drive line 10 is indicated to the operator of the vehicle so the operator can evaluate the performance of the drive line 10. The method of this further embodiment of the subject invention includes the step of activating an alarm indicator 24 of the vehicle when one of the successively compared signals 20 is outside the developed performance tolerance of the acoustic energy 16. That is, if the difference ($\Delta_{signal}$) between the subsequent signal and the previous signal is greater than or equal to the upper performance tolerance (1) or less than or equal to the lower performance tolerance (2), then the alarm indicator 24 is activated. In such a case, the operator can refer to the indication of the level of the performance of the drive line 10 to immediately evaluate the performance of the drive line 10 relative to the developed performance tolerance upon realizing the alarm indicator 24. Referring to the example above, if the subsequent signal is compared to the previous signal, and the subsequent signal is outside +/−5%, then the alarm indicator 24 is activated so that the operator can evaluate the performance of their drive line 10.

Figure 2:
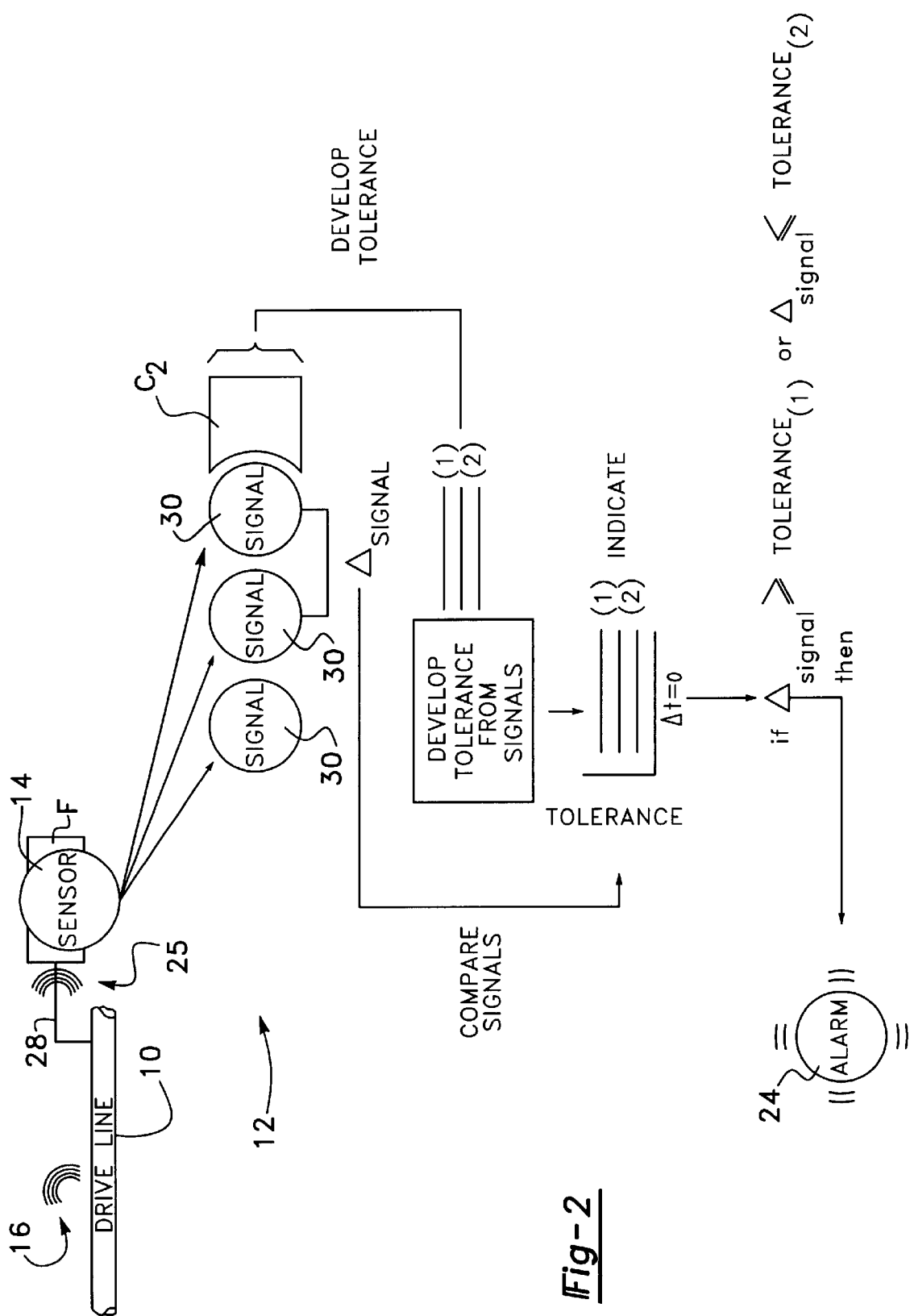
FIG. 2 is a schematic block diagram illustrating a method for monitoring the performance of the drive line of the vehicle that detects a quantity at the drive line of the vehicle, generates successive signals, and compares a subsequent signal to a previous signal to determine if the subsequent signal is outside a developed tolerance.

A further embodiment for monitoring the performance of a drive line 10 of a vehicle during driving of the vehicle is shown in FIG. 2. The method disclosed in FIG. 2 first detects a quantity at the drive line 10 of the vehicle. As appreciated, the quantity that is detected at the drive line may be acoustic energy 16 or vibration 25 present in the drive line 10 of the vehicle. The sensor 14 is employed to accomplish this detection. However, the sensor 14 employed in this alternative embodiment does not require a non-contacting sensor as in the case of the embodiment disclosed in FIGS. 1A and 1B. Instead, in sensing acoustic energy 16 or vibration 25, the sensor 14 may be in direct contact with the drive line 10 of the vehicle as shown at 28. Continuing, successive signals 30 are generated from the sensor 14 that represent the quantity (acoustic energy 16 or vibration 25) at the drive line 10 of the vehicle. Similar to the embodiment disclosed in FIG. 1B above, the successive signals 30 are preferably realized as wave signals having measurable sinusoidal characteristics over time such as particular cycles, periods, and amplitudes.

Next, a tolerance, similar to the performance tolerance disclosed in the above embodiment, is developed by evaluating the particular cycles, periods, and amplitudes from the successive signals 30, and at least one subsequent signal from the sensor 14 is compared to at least one previous signal from the sensor 14. As appreciated, similar to FIG. 1B, the embodiment disclosed in FIG. 2 may compare more than one subsequent signal to more than one previous signal. Also, the controller $C_2$ is implemented to evaluate the successively generated signals 30 and formulate the tolerance. As shown in FIG. 2, the tolerance is more specifically defined by an upper tolerance (1) and a lower tolerance (2). It is then determined if the subsequent signal is outside the developed tolerances. As above, the controller $C_2$ can be implemented to compare and determine if the subsequent signal is outside the developed tolerances. Alternatively, an additional controller, not shown in the FIG. 2, can be implemented to conduct this comparison. This enables the operator to monitor the performance of the drive line 10 during driving of the vehicle.

As with the embodiments disclosed above, this method also incorporates steps of indicating a level of the performance of the drive line 10 to the operator of the vehicle, and activating the alarm indicator 24 of the vehicle when one of the successively compared signals 30 is outside the developed tolerances. That is, if the difference ($\Delta_{signal}$) between the subsequent signal and the previous signal is greater than or equal to the upper tolerance (1) or less than or equal to the lower tolerance (2), then the alarm indicator 24 is activated.

Figure 3:
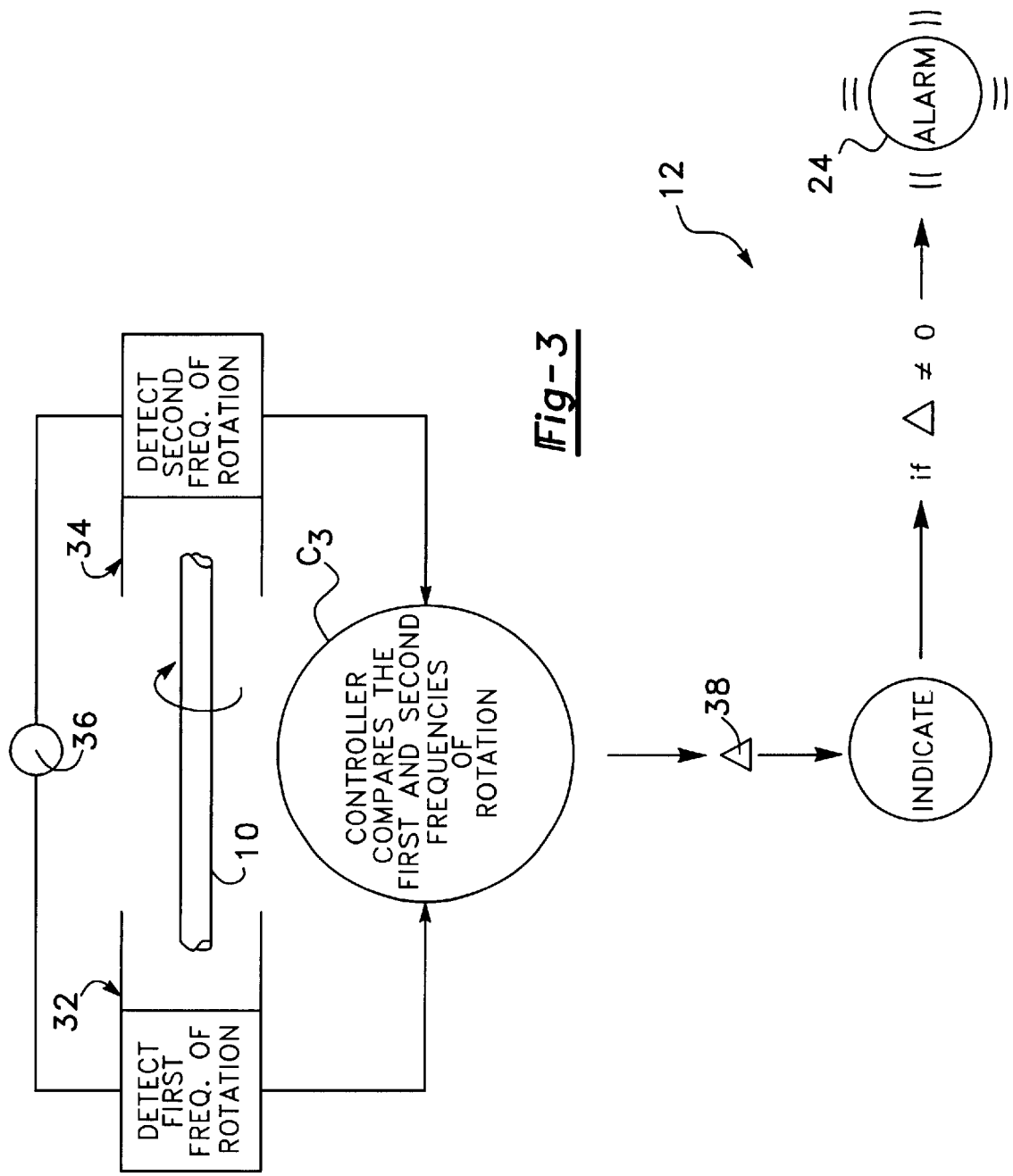
FIG. 3 is a schematic block diagram illustrating a method for monitoring the performance of the drive line of the vehicle that detects and compares rotation at first and second ends of the drive line.

A further embodiment of the subject invention is disclosed in FIG. 3. The method disclosed in FIG. 3 detects a first frequency of rotation at a first end 32 of the drive line 10. Identically, the method detects a second frequency of rotation at a second end 34 of the drive line 10. As appreciated, a dual sensor 36 is utilized to detect both the first and second frequencies of rotation. Alternatively, a first sensor and a second sensor, not shown in FIG. 3, may be implemented to detect the first and second frequencies of rotation, respectively. In this embodiment, the performance of the drive line 10 of the vehicle is monitored by comparing the first frequency of rotation at the first end of the drive line 10 and the second frequency of rotation at the second end of the drive line 10. This comparison occurs while the operator is driving the vehicle. More specifically, a controller, $C_3$, is implemented to conduct the comparison between the first and second frequencies of rotation, and the controller $C_3$ determines a differential 38 ($\Delta$). Finally, as with the embodiments disclosed above, this method also incorporates steps of indicating a performance level of the drive line 10 to the operator, and activating the alarm indicator 24 to the operator of the vehicle when the differential 38 between the first frequency of rotation and the second frequency of rotation is non-zero. That is, if the differential 38 between the two frequencies of rotation is not equal to zero, then the alarm indicator 24 is activated. Indication of the alarm 24 represents a defective drive line 10 or universal joint. As appreciated, in vehicles that utilize more than one drive line, a strategic number of sensors can be implemented in order to isolate which drive line or which universal joint is defective. Of course, the critical value of the differential 38 that is assigned to activate the alarm indicator 24 can be appropriately adjusted to prevent over-sensitive activation of the alarm indicator 24. That is, the differential 38 may be allowed some degree of tolerance before a failure is indicated.

As appreciated, the sensor 14 and the controllers $C_1$, $C_2$, and $C_3$ introduced in the above embodiments can be known in the art. Alternatively, a worker may develop a sensor or a controller and such developments will not vary the scope of the subject invention.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method for monitoring the performance of a drive line of a vehicle during driving of the vehicle, said method comprising the steps of:

mounting a sensor on a component of the vehicle other than the drive line, for detecting acoustic energy present in the drive line of the vehicle;

utilizing said sensor for sensing acoustic energy of the drive line during driving of the vehicle and generating a signal indicative of said sensed acoustic energy.

2. A method as set forth in claim 1 wherein the step of mounting the sensor is further defined by mounting the sensor on a support structure of the drive line.

3. A method as set forth in claim 1 further comprising the step of comparing the signal from the sensor to a predetermined operating limit of the acoustic energy representing an acceptable limit of performance of the drive line.

4. A method as set forth in claim 3 further comprising the step of providing a scale of the performance of the drive line encompassing the predetermined operating limit.

5. A method as set forth in claim 1 wherein the step of generating at least one signal from the sensor is further defined by generating successive signals representing the acoustic energy present in the drive line.

6. A method for monitoring the performance of a drive line of a vehicle during driving of the vehicle, said method comprising the steps of:

mounting a sensor on a component of the vehicle other than the drive line, for detecting acoustic energy present in the drive line of the vehicle;

sensing acoustic energy of the drive line during driving of the vehicle and generating a successive signals indicative of said sensed acoustic energy and representing the acoustic energy present in the drive line; and developing a performance of tolerance of the acoustic energy from the successive signals.

7. A method as set forth in claim 6 further comprising the step of comparing at least one subsequent signal from the sensor to at least one previous signal from the sensor, and determining if the subsequent signal is outside the developed performance tolerance of the acoustic energy.

8. A method for monitoring the performance of a drive line of a vehicle during driving of the vehicle, said method comprising the steps of:

detecting a quantity at the drive line of the vehicle;

generating successive signals representing the quantity of the drive line of the vehicle;

developing a tolerance from the successive signals; and comparing at least one subsequent signal to at least one previous signal and determining if the subsequent signal is outside the developed tolerance for monitoring the performance of the drive line during driving of the vehicle.

9. A method as set forth in claim 8 further comprising the step of indicating a level of the performance of the drive line to an operator of the vehicle.

10. A method as set forth in claim 8 further comprising the step of providing an alarm indicator to the operator of the vehicle when one of the successively compared signals is outside the developed tolerance.

11. A method as set forth in claim 8 wherein the step of detecting the quantity of the drive line is further defined by detecting acoustic energy.

12. A method as set forth in claim 8 wherein the step of detecting the quantity of the drive line is further defined by detecting vibration.

13. A drive line-and-sensor assembly for monitoring the performance of a drive line during driving of a vehicle, said assembly comprising:

a sensor mounted on a component of the vehicle other than the drive line, for detecting acoustic energy present in the drive line of the vehicle and sensing said acoustic energy, and for generating a signal representative of the acoustic energy present in the drive line of the vehicle; and a controller for receiving and comparing the signal representative of the acoustic energy.

14. A drive line-and-sensor assembly for monitoring the performance of a drive line during driving of a vehicle, said assembly comprising:

a sensor for detecting a quantity at the drive line of the vehicle, and for generating successive signals representing the quantity at the drive line of the vehicle; and a controller for developing a tolerance from the successive signals, and for comparing at least one subsequent signal to at least one previous signal to determine if the subsequent signal is outside the developed tolerance for monitoring the performance of the drive line during driving of the vehicle.

15. The method as recited in claim 1 wherein the step of mounting said sensor includes mounting said sensor on a frame of the vehicle.

16. The method as recited in claim 1 wherein the step of mounting said sensor includes mounting said sensor in an air brake chamber of the vehicle.

17. The drive line-and sensor assembly as recited in claim 13 wherein said component of the vehicle other than the drive line is a frame of the vehicle.

18. The drive line-and sensor assembly as recited in claim 13 wherein said component of the vehicle other than the drive line is in an air brake chamber of the vehicle.

* * * * *